(12) United States Patent
McGee et al.

(10) Patent No.: US 6,915,341 B2
(45) Date of Patent: Jul. 5, 2005

(54) SYSTEM FOR SENDING MESSAGES TO ALL USERS IN A WEB HOSTING ENVIRONMENT

(75) Inventors: Jason R. McGee, Morrisville, NC (US); Christopher C. Mitchell, Raleigh, NC (US); Michael J. Morton, Cary, NC (US); Brent A. Peters, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 738 days.

(21) Appl. No.: 10/041,379

(22) Filed: Jan. 8, 2002

(65) Prior Publication Data

US 2003/0131092 A1 Jul. 10, 2003

(51) Int. Cl.$^7$ .............................................. G06F 15/173
(52) U.S. Cl. ..................... 709/223; 709/203; 709/206; 714/48; 715/733
(58) Field of Search ............................... 709/223, 224, 709/203, 206; 715/733; 714/48

(56) References Cited

U.S. PATENT DOCUMENTS

| | | | | |
|---|---|---|---|---|
| 5,265,212 A | * | 11/1993 | Bruce, II | 710/113 |
| 5,953,475 A | | 9/1999 | Beier et al. | 385/76 |
| 5,987,611 A | | 11/1999 | Freund | 713/201 |
| 6,023,722 A | | 2/2000 | Colyer | 709/201 |
| 6,034,970 A | | 3/2000 | Levac et al. | 370/466 |
| 6,094,681 A | | 7/2000 | Shaffer et al. | 709/224 |
| 6,098,093 A | | 8/2000 | Bayeh et al. | 709/203 |
| 6,105,063 A | | 8/2000 | Hayes, Jr. | 709/223 |
| 6,105,067 A | | 8/2000 | Batra | 709/227 |
| 6,118,936 A | * | 9/2000 | Lauer et al. | 709/224 |
| 6,119,078 A | | 9/2000 | Kobayakawa et al. | 704/3 |
| 6,167,253 A | | 12/2000 | Farris et al. | 455/412 |
| 6,167,448 A | | 12/2000 | Hemphill et al. | 709/224 |
| 6,189,047 B1 | | 2/2001 | Ball | 709/318 |
| 6,212,640 B1 | | 4/2001 | Abdelnur et al. | 713/201 |
| 6,229,534 B1 | * | 5/2001 | Gerra et al. | 715/733 |
| 6,657,990 B1 | * | 12/2003 | Dilip et al. | 370/352 |
| 6,662,224 B1 | * | 12/2003 | Angwin et al. | 709/224 |
| 2001/0022591 A1 | * | 9/2001 | Gerra et al. | 345/744 |
| 2002/0073364 A1 | * | 6/2002 | Katagiri et al. | 714/48 |
| 2002/0143908 A1 | * | 10/2002 | Taggart et al. | 709/223 |

FOREIGN PATENT DOCUMENTS

JP 411249981 A 9/1999

* cited by examiner

*Primary Examiner*—Hosain Alam
*Assistant Examiner*—Liang-che Wang
(74) *Attorney, Agent, or Firm*—Synnestvedt & Lechner LLP; Bruce Clay

(57) ABSTRACT

A system of selectively sending messages to clients interacting with a server in a distributed network computing environment. The message is sent from the system administrator to the users by posting a message to a server, detecting receipt at the server of requests for data from users, and sending the message to the users in response to received requests from the users.

25 Claims, 3 Drawing Sheets

SYSTEM FOR SENDING MESSAGES TO ALL USERS IN A WEB HOSTING ENVIRONMENT

FIELD OF THE INVENTION

The present invention relates to computer communications. More particularly, it deals with communicating between system administrators and users in a web hosting environment.

BACKGROUND OF THE INVENTION

The Internet is a vast collection of computing resources, interconnected as a network, existing at locations all over the world. It is used daily by millions of people. The World Wide Web (hereinafter the "Web") is that portion of the Internet which uses the HyperText Transfer Protocol (HTTP) as a protocol for exchanging messages. (Alternatively, the "HTTPS" protocol can be used, which is a security-enhanced version of HTTP.) The Web environment has become the most popular method of accessing and distributing data over the Internet.

A user of the Internet typically accesses and uses the Internet by establishing a network connection through the services of an Internet Service Provider (ISP). An ISP provides computer users with the ability to dial a telephone number using their computer modem (or other connection facility, such as satellite transmission), thereby establishing a connection to a remote computer owned or managed by the ISP. This remote computer then makes services available to the user's computer. Typical services include: providing a search facility to search throughout the interconnected computers of the Internet for items of interest to the user; a browse capability, for displaying information located with the search facility; and an electronic mail facility, with which the user can send and receive mail messages from other computer users. The Internet is a "distributed network", meaning that resources and users can reside at various locations all over the world.

The HTTP protocol uses a request/response paradigm, where the electronic messages sent between communicating computers can be categorized as either requests for information, or responses to those requests. A request from the user is in the form of a Uniform Resource Locator (URL). A URL is an address or location of a resource located on the Web.

The user working in a Web environment will have software running on his computer to allow him to create and send requests for information, and to see the results. These functions are typically combined in what is referred to as a "Web browser", or "browser". After the user has created his request using the browser, the request message is sent out into the Internet for processing. The target of the request message is one of the interconnected computers in the Internet network. That computer will receive the message, attempt to find the data satisfying the user's request, format that data for display with the user's browser, and return the formatted response to the browser software running on the user's computer. The data returned to the user can be a "web page" or "web site", which is one of the many files located on the server.

This is an example of a client-server model of computing, where the machine at which the user requests information is referred to as the client, and the computer that locates the information and returns it to the client is the server. In the Web environment, the server is referred to as a "Web server". The client-server model may be extended to what is referred to as a "three-tier architecture". This architecture places the Web server in the middle tier, where the added third tier typically represents data repositories of information that may be accessed by the Web server as part of the task of processing the client's request. This three-tiered architecture recognizes the fact that many client requests do not simply require the location and return of static data, but require an application program to perform processing of the client's request in order to dynamically create the data to be returned. In this architecture, the Web server may equivalently be referred to as an "application server", reflecting the fact that this middle tier is where the business logic of the application typically resides, and the computers on which the data repositories reside may be referred to as "data servers", or "backend data servers".

The Java programming language is gaining wide acceptance for writing Web applications, as it is a robust portable object-oriented language defined specifically for the Web environment. ("Java" is a trademark of Sun Microsystems, Inc.) Java attains its portability through use of a specifically-designed virtual machine. An application server that implements a Java virtual machine can be functionally extended using Java "servlets". A servlet is a relatively small executable code object that can be dynamically plugged in, or added, to the code running on the server. Servlets typically perform some specialized function, which can be invoked by the server (or by another servlet) to extend its own functionality. The servlet processes the request, and returns the response to the server (or servlet) that invoked it.

The person managing a web server is known as the System Administrator. The System Administrator uses an application server to manage one or many web sites. This process is referred to as "web hosting." An example of such an application server that facilitates web hosting is WebSphere provided by IBM. WebSphere allows a system administrator to create and manage sophisticated web pages. It consists of a set of Java-based tools that allows the System Administrator to connect users with servlets running on the application server.

The web environment provides System Administrators a means of providing information contained on their web site to a large number of users at any location where there is a means to access the Internet. This is a good example of a distributed network, as the user group is a constantly changing undefined group of client computers. However, this also creates some problems in the web environment that did not previously exist in a localized area network (LAN) environment.

One problem that exists is that there currently is no effective means for the System Administrator to communicate with the users who are accessing a web site at any given moment. Because of the nature of a distributed network, it is impossible for the system administrator to send a message to the users in the manner that could have been used with a LAN environment. There is no means to determine exactly who comprises the user group at any given time, as different users can be accessing the system at any moment. Unlike previous network environments (such as LANs), there is no physical limitation to the number of computers that provide user access in the Web environment.

There are times when a web site needs to be taken offline for some period of time. This can be due to an emergency situation caused by some type of technical problem, or it could be for a routine operation (e.g., updating the content on the site). Currently, anyone using the website when it is taken offline has their session terminated without warning when the system is shut down. Any partially completed transactions are lost, and anyone attempting to further access the site finds that their browser cannot locate it.

In the event that the System Administrator intends to shut down the application server (i.e., web site), it would be desirable to notify users of such intent prior to the actual shutdown. It is desirable to send a message to the users notifying them of the impending shutdown so that they can attempt to complete any unfinished transactions that may be pending, or, at a minimum, provide information as to the status of the web site and the expected time when access will be restored. Therefore, it would be desirable for System Administrators to have the ability to send messages to the users of their systems in the web environment.

SUMMARY OF THE INVENTION

The present invention is a method and apparatus to allow System Administrators in web hosting environments to communicate with the users of the network. The invention allows for System Administrators to post messages to a server. The messages are then transmitted to a client when a request from a browser is received.

In the preferred embodiment, the messages can be of two types. The first type would continue to allow the user to access the system for a period of time. This type of message shall be referred to as a "soft" message. For example, a System Administrator for an online shopping site may need to shut down the system at a given time (e.g., in 10 minutes) for maintenance. A soft message would be sent to inform the user that the system would be shut down in 10 minutes and all transactions should be completed prior to that time.

The second type of message would stop access to the current application immediately. This type of message shall be referred to as a "hard" message. An example of a hard message would be informing the user that the system was shutdown and they have been disconnected.

The System Administrator would determine the type, content, and lifetime (the duration that a message would be displayed) of the message he or she desires to send to the user. This information is sent to an application server or servlet. The message would be processed by the application server or servlet and sent in response to all user requests received by the server during the designated lifetime of the message.

The response would be sent by the application server using existing HTML technology. The user would see their requested data along with the message from the System Administrator in the case of a soft message, or the user would view solely the message from the system administrator in the case of a hard message.

DETAILED DESCRIPTION OF THE INVENTION

The system described herein provides a method for System Administrators to send a message or notification to users in a Web hosting environment. The preferred embodiment is a web server running one or more Java servlets along with a web hosting application server product, such as WebSphere by International Business Machines Corporation (IBM) of Armonk, N.Y. Although this embodiment is discussed herein in detail, it should be understood that the present invention also can be applied to other platforms and web hosting application servers.

Figure 1:
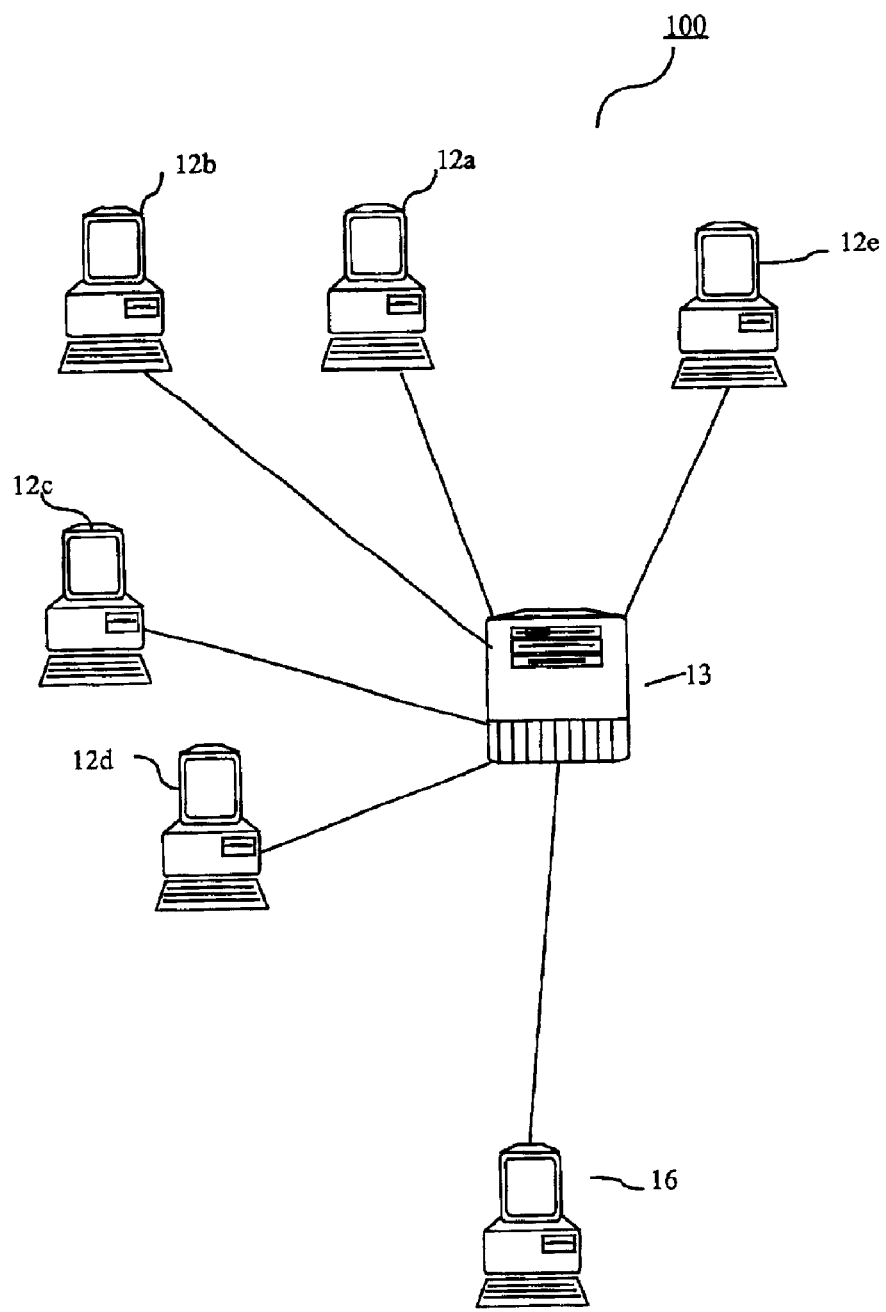
FIG. 1 is a block diagram illustrating the network environment in which the present invention will operate.
Figure 2:
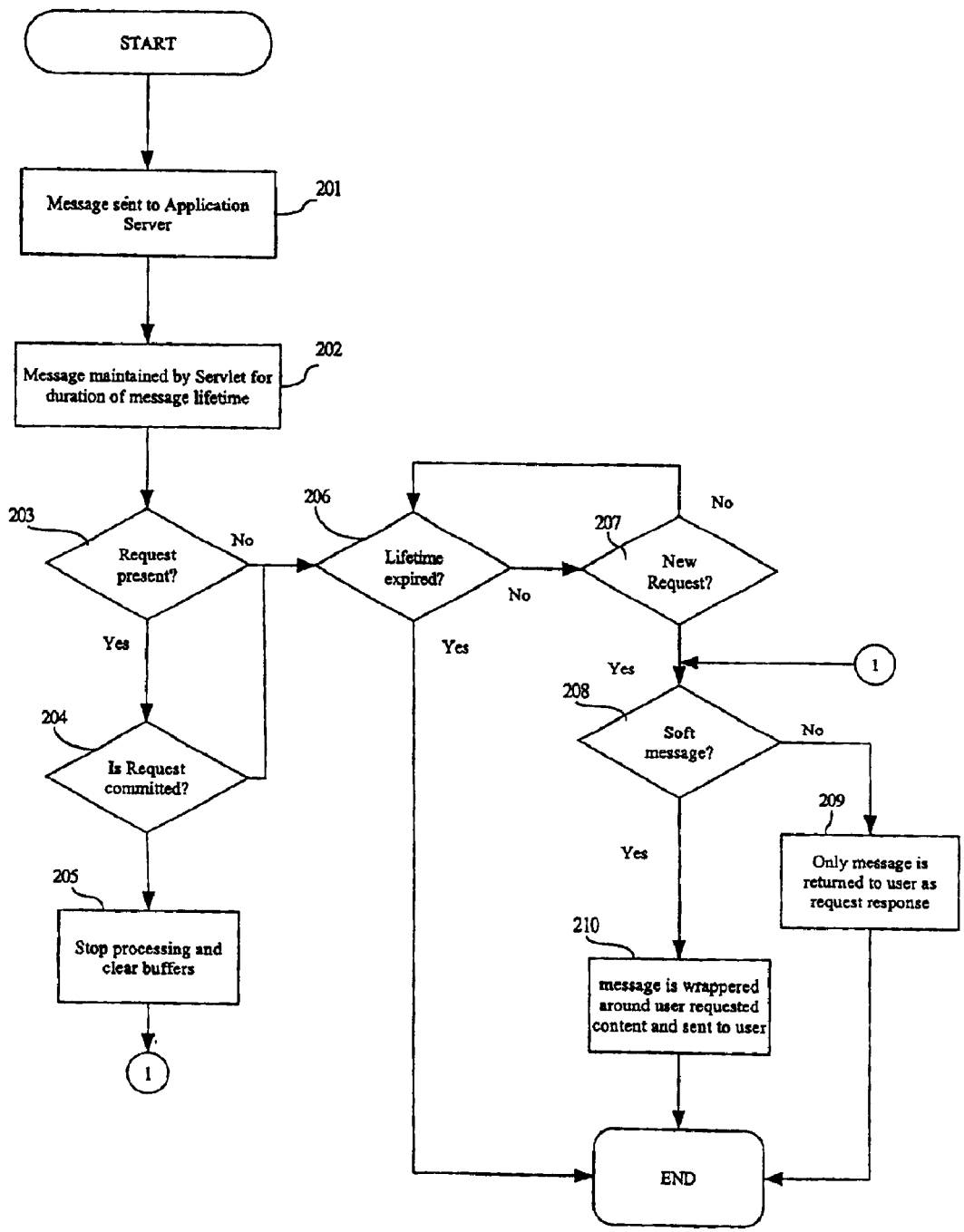
FIG. 2 is a flowchart illustrating the process carried out by the present invention.

FIG. 1 is a block diagram of a distributed network where the present invention is implemented. The network shown in FIG. 1 comprises a series of client computers (12a–12e) for use by individual users all interconnected via a server 13. A computer 16 is shown to demonstrate a location from which the System Administrator can access the network. Those of skill in the art will understand that some web site administrators maintain a plurality of servers to maintain a single web site. On the other hand, other companies, such as Web hosting companies, might maintain multiple web sites using a single server. For simplicity, the network shown in FIG. 1 assumes a single server functioning as both the application server and the data server.

In the preferred embodiment, the server 13 has one or more Java servlets running on it. In addition, a web hosting application server product such as WebSphere is also running on the server.

Let us assume the System Administrator would like to send a message to all users (e.g., he would like to perform maintenance on the web site and plans to shut down the site temporarily). The System Administrator determines the content of the message he desires to send (e.g., some combination of text and/or graphics), the type of message (hard or soft), and the duration or lifetime of the message. This information can be described in extensible markup language (XML) files. The content of the message can then be posted to the application server using an HTTP Post command and additional HTTP commands can be sent to define the type and duration of the message. A preferred method is to use Simple Object Access Protocol (SOAP). SOAP is an application layer protocol that is layered on top of HTTP and allows objects to be accessed through the application server. Through the use of SOAP commands, the message content, type, and duration can be defined in an Extensible Markup Language (XML) format. SOAP packages the HTTP Post of the content with the operating parameters (type and duration) and sends the file to the application server. When the message is received by the server, it is unpackaged in accordance with SOAP, and the object is processed.

Once a message has been received by the application server, it needs to be sent to the client computer. The message is processed by the application server to determine the type, duration and content. The application server must then check to see if there are any client requests currently in process when the message from the System Administrator is received.

Any such pending requests can be divided into two distinct categories. The first category comprises "committed" requests. These are requests for which responses have been processed and data has begun to be written to the client. In the case of a committed request, no action is taken by the application server to included the message in the response to the committed request.

The second type of pending request is a "non-committed" request. This is a request that may have been processed, but no response data has yet been written to the client. The response data is most likely in a buffered state prior to being sent to the client. In the case of non-committed responses, the processing is halted and the buffers are cleared. The request is then reprocessed as a new request.

Any new requests received during the lifetime of the message will be sent the message from the System Administrator.

The response can be handled in two ways, depending upon the type of message provided by the System Administrator. The messages can be of two types. A soft message would be sent when the user is to be able to continue to access the system for a period of time. For example, a System Administrator for an online shopping site may need to shut down the system at a given time (e.g., in 10 minutes) for maintenance. A soft message would be sent to inform the user that the system would be shut down in 10 minutes and all transactions should be completed prior to that time.

A hard message would be sent to inform the user that access to the site was terminated. An example of a hard message would be one informing the user that the site was shutdown and he or she has been disconnected.

Once a hard message is sent to the application server by the System Administrator, client requests receive only the message content in response. The clinets would not receive any data associated with their original requested URLs. Sending the message content in response to a request can be accomplished by returning an HTML document generated by the application server displaying the message from the system administrator, or it could be done using a HTTP 304 send redirect response where the user is sent to a new location containing the message. In either case, the user receives only the message and does not receive any data associated with the original user URL.

With respect to soft messages, the application server processes the requested URL so that the client will receive the content of the original request, however, in addition, the client is sent the soft message from the System Administrator. More specifically, instead of returning the HTML file requested by the client, the application server will dynamically generate a new HTML response. In order to do this, the application server generates a "wrappered" response. This type of response is well known in the art, and would allow the user to view both the response to the requested URL and the message from the System Administrator simultaneously. The response can be sent using the HTTP Frame function, whereby a frameset is generated to display the data responsive to the requested URL along with the message from the system administrator. A frameset is a mechanism that divides the client's screen to display two URL's simultaneously. The requested URL is viewed on one portion of the screen, while the message from the System Administrator is displayed on a separate portion of the screen (e.g., along the top edge).

Other HTML techniques besides the HTTP frame response can be used to perform the same function. For instance, the application server could process the requested URL and retrieve the requested HTML response, but dynamically modify the HTML file to insert the message directly into the client requested file. This can be done using a divided section of a page (<DIV>) response, which is part of the standard HTML technology.

The difference in these two techniques lies in the change to the HTML which is returned to the user. Using the frameset technique, data returned to the client is not modified but merely wrapped in a frame set including the message from the System Administrator. Using the <DIV> technique, the actual data file requested is modified to include the message from the System Administrator.

Figure 3:
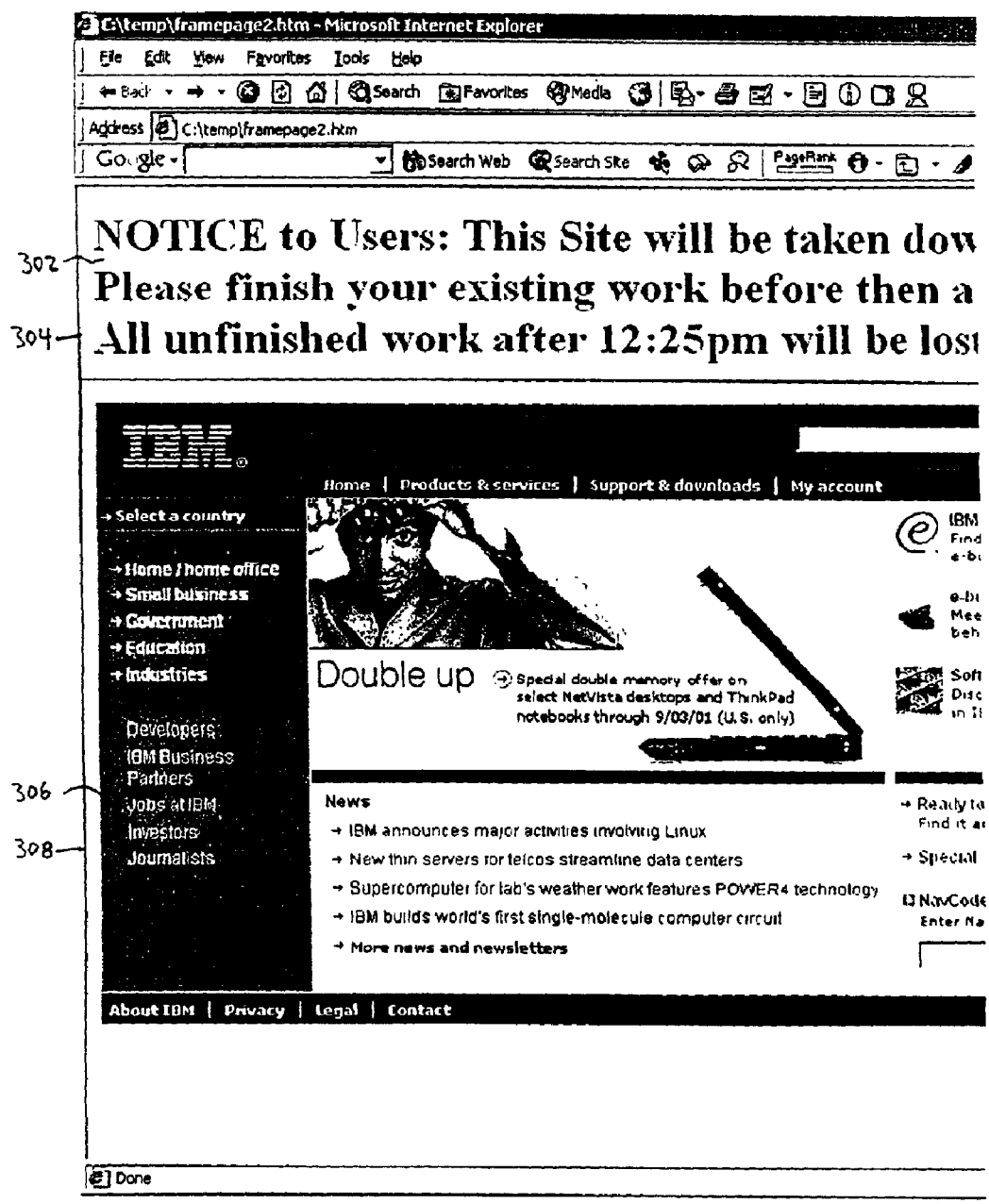
FIG. 3 shows a response screen as would appear on the user's computer displaying the message from the system administrator in conjunction with the web page originally requested in accordance with one preferred embodiment of the present invention.

Either technique results in the client's screen 300 showing both the requested information and the message from the System Administrator. FIG. 3 shows a response screen using either approach. The message 302 from the system administrator appears across the top 304 of the user's screen, while the originally requested content 306 appears at on the remainder of the screen 308.

The original content received from the System Administrator by the application server instructs the application server as to the duration or lifetime of the message. During the specified lifetime of the message, all client requests received by the application server are treated as discussed above. Once the lifetime of the System Administrator message expires, the application server returns to the standard processing of client requests.

In embodiments where there is a separate data server and application server, the System Administrator can send a message to the application server following the shutdown of the data server. For example, a soft message could be sent informing users of a pending shutdown. Following the expiration of the soft message and the shutdown of the data server, a hard message could be sent informing users the site was offline.. The application server can process client requests by sending only the hard message while the data server is shut down. In embodiments where the same server functions both as an application server and a data server, nothing would be sent to the client following the actual shut down of the server because the application server would be shut down and thus incapable of sending any further messages.

The present invention allows System Administrators to provide messages directly to the users of a web site. This give the System Administrator the ability to provide notice to the user in emergency situations where a problem might exist with the web site, or in the event of routine servicing that will cause access to the site to be temporarily suspended. With the increasing popularity of interactive web sites (e.g., online shopping sites, chat rooms, etc.), this is a valuable tool. It can allow users to prepare for the pending action by the System Administrator as a result of receiving the notification (e.g., complete their transaction) or at a minimum provide explanation as to the reason they have been disconnected.

It should be understood that the foregoing is illustrative and not limiting and that obvious modifications may be made by those skilled in the art without departing from the spirit of the invention. Accordingly, the specification is intended to cover such alternatives, modifications, and equivalence as may be included within the spirit and scope of the invention as defined in the following claims.

We claim:

1. A method of selectively sending to clients interacting with a server in a distributed network computing environment a messages having content that is not responsive to requests issued by said clients, said method comprising the steps of:

posting to a server a message from an administrator of said distributed network computer environment concerning operations of said server;

detecting receipt at said server of requests for data from users; and sending said message to said users responsive to said received requests and said data requested by said clients, said step of sending said message with said data requested by said client comprising the steps of:

combining said message in a frameset with said requested data, said frameset including a first portion comprising said data requested by said client and a second portion comprising said message from said administrator; and sending said frameset to said client.

2. The method of claim 1 wherein said sending step comprises sending said message instead of said data requested by said clients.

3. The method of claim 1 further comprising the steps of:

identifying a time period over which said message is to be sent to clients; and identifying a type for said message, said type indicating whether said message is to be sent to clients along with said requested data or instead of said requested data.

4. The method of claim 3 wherein said sending step comprises sending said message in response to requests received only during said identified time period.

5. The method of claim 4 wherein said sending step further comprises sending said message with said requested data or instead of said requested data as a function of said message type.

6. The method of claim 1 wherein said step of posting said message comprises posting an XML file to said server using an HTTP Post command, said XML file containing said message.

7. The method of claim 5 wherein said step of posting said message comprises posting an XML file to said server using an HTTP Post command, said XML file containing said message.

8. The method of claim 7 wherein said steps of identifying a time period and identifying a type for said message comprises sending additional HTTP commands to said server.

9. The method of claim 1 wherein said step of posting said message comprises the use of Simple Object Access Protocol.

10. The method of claim 5 wherein said step of posting said message comprises the use of Simple Object Access Protocol.

11. The method of claim 10 wherein said steps of identifying a time period and identifying a type for said message comprises sending additional Simple Object Access Protocol commands to said server.

12. The method of claim 1 further comprising the steps of:

clearing all buffers associated with received, but non-committed, requests from clients; and re-processing said received but non-committed requests.

13. The method of claim 1 further comprising the steps of:

identifying all pending requests at the time said message is posted;

segregating said pending requests into committed requests and non-committed requests;

clearing all buffers associated with received, but non-committed, requests from clients; and re-processing said received but non-committed requests.

14. The method of claim 1 wherein said step of sending said message with said data requested by said client comprises the steps of:

dynamically modifying an HTML file responsive to said request by said client to add said message within said file.

15. The method of claim 14 wherein said step of dynamically modifying comprises adding said contents of said message into said file using a separate <DIV> tag.

16. A computer program product for selectively sending to clients interacting with a server in a distributed network computing environment a messages having content that is not responsive to requests from a client, comprising computer executable instructions stored on a computer readable medium for:

sending to said server a message from a System Administrator of said distributed network computing environment concerning operation of said server; maintaining said message on said server;

sending said message to said client in response to a browser request for data from said client, along with said data requested by said client, said sending of said message with said data including:

combining said message in a frameset with said requested data, said frameset including a first portion comprising said data requested by said client and a second portion comprising said message from said System Administrator; and sending said frameset to said client.

17. A computer program product as set forth in claim 16, wherein the computer executable instructions for sending said message to said client in response to a browser request from said client further comprise:

instructions for sending said message along with said data requested by said browser.

18. A computer program product as set forth in claim 16, wherein the computer executable instructions for sending a message from said System Administrator to said server further comprise:

instructions for configuring the message in an XML file and sending the XML file to the server using an HTTP Post command or a Single Object Access Protocol command.

19. A computer program product as set forth in claim 16, wherein the computer executable instructions for maintaining said message on said server are executed using at least one servlet.

20. A computer program product as set forth in claim 16, wherein the computer executable instructions for sending said message to said client in response to a browser request for data from said client further comprise instructions for:

identifying all pending requests at the time said message is sent to said server;

segregating said pending requests into committed requests and non-committed requests;

clearing all buffers associated with received but non-committed requests;

re-processing said received but non-committed requests.

21. A computer program product as set forth in claim 17, wherein the computer executable instructions for sending said message to said client in response to a browser request for data from said client further comprise instructions for:

combining said message in a frameset with said requested data; and sending said frameset to said client.

22. A computer program product as set forth in claim 17, wherein the computer executable instructions for sending said message to said client in response to a browser request for data from said client further comprise instructions for:

dynamically modifying an HTML file responsive to said request by said client to add said message within said file; and sending said file to said client.

23. A method of selectively sending to clients interacting with a server in a distributed network computing environment a series of messages that are not responsive to requests from a client browser, said method comprising the steps of:

posting to a server a first message from an administrator of said distributed network computer environment concerning operations of said server;

maintaining said message on said server for a specified period of time;

detecting receipt at said server of requests for data from a client browser during said specified period of time;

sending said first message in combination with data responsive to said requests to said browser, wherein said requests are received by said server during said specified period of time, said sending said first message in combination with said data responsive to said requests comprising:

combining said message in a frameset with said requested data, said frameset including a first portion comprising said data requested by said client and a second portion comprising said message from said administrator; and sending said frameset to said client;

posting a second message to a server at the expiration of said specified period of time;

detecting receipt at said server of requests for data from a client browser received after the expiration of said specified period of time; and sending said second message instead of data responsive to said browser responsive to said requests.

24. A method as set forth in claim 23, wherein said specified period of time is determined by sending additional HTTP commands to said server in conjunction with said first message.

25. A method as set forth in claim 23, wherein the step of detecting receipt at said server of requests for data from a client browser during said specified period of time further comprises the steps of:

identifying all pending requests at the time said first message is posted;

segregating said pending requests into committed requests and non-committed requests;

clearing all buffers associated with received, but non-committed requests; and re-processing said received but non-committed requests.

\* \* \* \* \*

UNITED STATES PATENT AND TRADEMARK OFFICE
CERTIFICATE OF CORRECTION

PATENT NO. : 6,915,341 B2
DATED : July 5, 2005
INVENTOR(S) : McGee et al.

It is certified that error appears in the above-identified patent and that said Letters Patent is hereby corrected as shown below:

Column 6,
Line 54, should read as follows:
-- ment a message[[s]] having content that is not responsive to --.

Column 7,
Line 67, should read as follows:
-- computing environment a message[[s]] having content that is --.

Signed and Sealed this

Twentieth Day of December, 2005

JON W. DUDAS
*Director of the United States Patent and Trademark Office*